United States Patent
Li et al.

(10) Patent No.: US 9,441,550 B2
(45) Date of Patent: Sep. 13, 2016

(54) CYLINDER FIRING FRACTION DETERMINATION AND CONTROL SYSTEMS AND METHODS

(71) Applicant: GM Global Technology Operations LLC, Detroit, MI (US)

(72) Inventors: Jinbiao Li, Rochester Hills, MI (US); Haifeng Liu, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/300,469

(22) Filed: Jun. 10, 2014

(65) Prior Publication Data
US 2015/0354470 A1    Dec. 10, 2015

(51) Int. Cl.
| | |
|---|---|
| F02D 17/02 | (2006.01) |
| B60W 30/188 | (2012.01) |
| B60W 10/02 | (2006.01) |
| B60W 10/06 | (2006.01) |
| B60W 10/10 | (2012.01) |
| F02D 41/02 | (2006.01) |
| F02D 41/14 | (2006.01) |
| F02D 41/00 | (2006.01) |

(52) U.S. Cl.
CPC ............ *F02D 17/02* (2013.01); *B60W 10/023* (2013.01); *B60W 10/06* (2013.01); *B60W 10/10* (2013.01); *B60W 30/1882* (2013.01); *F02D 41/0087* (2013.01); *F02D 41/0215* (2013.01); *F02D 41/1406* (2013.01); *F02D 2200/0625* (2013.01); *F02D 2250/18* (2013.01)

(58) Field of Classification Search
None
See application file for complete search history.

(56) References Cited

U.S. PATENT DOCUMENTS

| | | | |
|---|---|---|---|
| 3,596,640 | A | 8/1971 | Bloomfield |
| 4,129,034 | A | 12/1978 | Niles et al. |
| 4,172,434 | A | 10/1979 | Coles |
| 4,377,997 | A | 3/1983 | Staerzl |
| 4,434,767 | A | 3/1984 | Kohama et al. |
| 4,489,695 | A | 12/1984 | Kohama et al. |
| 4,509,488 | A | 4/1985 | Forster et al. |
| 4,535,744 | A | 8/1985 | Matsumura |
| 4,770,148 | A | 9/1988 | Hibino et al. |

(Continued)

FOREIGN PATENT DOCUMENTS

| | | |
|---|---|---|
| CN | 1573916 A | 2/2005 |
| CN | 1888407 A | 1/2007 |

(Continued)

OTHER PUBLICATIONS

U.S. Appl. No. 13/798,351, Mar. 13, 2013, Rayl.

(Continued)

*Primary Examiner* — Ramya Burgess
*Assistant Examiner* — Timothy M Hannon (57) ABSTRACT

A selection module selects a gear ratio for a transmission, a turbine speed for a torque converter, and a torque request for an engine. A fueling determination module determines a first fueling rate based on a first cylinder firing fraction, the torque request, and an engine speed and determines a second fueling rate based on a second cylinder firing fraction, the torque request, and the engine speed. A mapping module selects one of the first and second cylinder firing fractions based on a comparison of the first and second fueling rates and stores the selected one of the first and second cylinder firing fractions in an entry of a mapping corresponding to the gear ratio, the turbine speed, and the torque request.

19 Claims, 5 Drawing Sheets

(56) References Cited

U.S. PATENT DOCUMENTS

| | | |
|---|---|---|
| 4,887,216 A | 12/1989 | Ohnari et al. |
| 4,974,563 A | 12/1990 | Ikeda et al. |
| 4,987,888 A | 1/1991 | Funabashi et al. |
| 5,042,444 A | 8/1991 | Hayes et al. |
| 5,094,213 A | 3/1992 | Dudek et al. |
| 5,226,513 A | 7/1993 | Shibayama |
| 5,278,760 A | 1/1994 | Ribbens et al. |
| 5,357,932 A | 10/1994 | Clinton et al. |
| 5,374,224 A | 12/1994 | Huffmaster et al. |
| 5,377,631 A | 1/1995 | Schechter |
| 5,423,208 A | 6/1995 | Dudek et al. |
| 5,465,617 A | 11/1995 | Dudek et al. |
| 5,496,227 A * | 3/1996 | Minowa et al. ............... 477/62 |
| 5,540,633 A | 7/1996 | Yamanaka et al. |
| 5,553,575 A | 9/1996 | Beck et al. |
| 5,584,266 A | 12/1996 | Motose et al. |
| 5,669,354 A | 9/1997 | Morris |
| 5,692,471 A | 12/1997 | Zhang |
| 5,720,257 A | 2/1998 | Motose et al. |
| 5,813,383 A | 9/1998 | Cummings |
| 5,884,605 A | 3/1999 | Nagaishi et al. |
| 5,909,720 A | 6/1999 | Yamaoka et al. |
| 5,931,140 A | 8/1999 | Maloney |
| 5,934,263 A | 8/1999 | Russ et al. |
| 5,941,927 A | 8/1999 | Pfitz |
| 5,975,052 A | 11/1999 | Moyer |
| 5,983,867 A | 11/1999 | Stuber et al. |
| 6,125,812 A | 10/2000 | Garabedian |
| 6,158,411 A | 12/2000 | Morikawa |
| 6,244,242 B1 | 6/2001 | Grizzle et al. |
| 6,247,449 B1 | 6/2001 | Persson |
| 6,272,427 B1 | 8/2001 | Wild et al. |
| 6,286,366 B1 | 9/2001 | Chen et al. |
| 6,295,500 B1 | 9/2001 | Cullen et al. |
| 6,332,446 B1 | 12/2001 | Matsumoto et al. |
| 6,334,425 B1 | 1/2002 | Nagatani et al. |
| 6,355,986 B1 | 3/2002 | Kato et al. |
| 6,360,724 B1 | 3/2002 | Suhre et al. |
| 6,363,316 B1 | 3/2002 | Soliman et al. |
| 6,371,075 B2 | 4/2002 | Koch |
| 6,385,521 B1 | 5/2002 | Ito |
| 6,408,625 B1 | 6/2002 | Woon et al. |
| 6,520,140 B2 | 2/2003 | Dreymuller et al. |
| 6,546,912 B2 | 4/2003 | Tuken |
| 6,619,258 B2 | 9/2003 | McKay et al. |
| 6,622,548 B1 | 9/2003 | Hernandez |
| 6,694,806 B2 | 2/2004 | Kumagai et al. |
| 6,754,577 B2 | 6/2004 | Gross et al. |
| 6,760,656 B2 | 7/2004 | Matthews et al. |
| 6,850,831 B2 | 2/2005 | Buckland et al. |
| 6,909,961 B2 | 6/2005 | Wild et al. |
| 6,978,204 B2 | 12/2005 | Surnilla et al. |
| 6,980,902 B2 | 12/2005 | Nakazawa |
| 6,981,492 B2 | 1/2006 | Barba et al. |
| 6,983,737 B2 | 1/2006 | Gross et al. |
| 7,003,390 B2 | 2/2006 | Kaga |
| 7,024,301 B1 | 4/2006 | Kar et al. |
| 7,028,661 B1 | 4/2006 | Bonne et al. |
| 7,032,545 B2 | 4/2006 | Lewis et al. |
| 7,032,581 B2 | 4/2006 | Gibson et al. |
| 7,044,101 B1 | 5/2006 | Duty et al. |
| 7,063,062 B2 | 6/2006 | Lewis et al. |
| 7,066,121 B2 | 6/2006 | Michelini et al. |
| 7,066,136 B2 | 6/2006 | Ogiso |
| 7,069,718 B2 | 7/2006 | Surnilla et al. |
| 7,069,773 B2 | 7/2006 | Stempnik et al. |
| 7,086,386 B2 | 8/2006 | Doering |
| 7,100,720 B2 | 9/2006 | Ishikawa |
| 7,111,612 B2 | 9/2006 | Michelini et al. |
| 7,140,355 B2 | 11/2006 | Michelini et al. |
| 7,159,568 B1 | 1/2007 | Lewis et al. |
| 7,174,713 B2 | 2/2007 | Nitzke et al. |
| 7,174,879 B1 | 2/2007 | Chol et al. |
| 7,200,486 B2 | 4/2007 | Tanaka et al. |
| 7,203,588 B2 | 4/2007 | Kaneko et al. |
| 7,231,907 B2 | 6/2007 | Bolander et al. |
| 7,278,391 B1 | 10/2007 | Wong et al. |
| 7,292,231 B2 | 11/2007 | Kodama et al. |
| 7,292,931 B2 | 11/2007 | Davis et al. |
| 7,319,929 B1 | 1/2008 | Davis et al. |
| 7,363,111 B2 | 4/2008 | Vian et al. |
| 7,367,318 B2 | 5/2008 | Moriya et al. |
| 7,415,345 B2 | 8/2008 | Wild |
| 7,440,838 B2 | 10/2008 | Livshiz et al. |
| 7,464,676 B2 | 12/2008 | Wiggins et al. |
| 7,472,014 B1 | 12/2008 | Albertson et al. |
| 7,497,074 B2 | 3/2009 | Surnilla et al. |
| 7,499,791 B2 | 3/2009 | You et al. |
| 7,503,312 B2 | 3/2009 | Surnilla et al. |
| 7,509,201 B2 | 3/2009 | Bolander et al. |
| 7,555,896 B2 | 7/2009 | Lewis et al. |
| 7,577,511 B1 | 8/2009 | Tripathi et al. |
| 7,581,531 B2 | 9/2009 | Schulz |
| 7,614,384 B2 | 11/2009 | Livshiz et al. |
| 7,620,188 B2 | 11/2009 | Inoue et al. |
| 7,621,262 B2 | 11/2009 | Zubeck |
| 7,634,349 B2 | 12/2009 | Senft et al. |
| 7,685,976 B2 | 3/2010 | Marriott |
| 7,785,230 B2 | 8/2010 | Gibson et al. |
| 7,836,866 B2 | 11/2010 | Luken et al. |
| 7,849,835 B2 | 12/2010 | Tripathi et al. |
| 7,886,715 B2 | 2/2011 | Tripathi et al. |
| 7,930,087 B2 | 4/2011 | Gibson et al. |
| 7,946,263 B2 | 5/2011 | O'Neill et al. |
| 7,954,474 B2 | 6/2011 | Tripathi et al. |
| 8,050,841 B2 | 11/2011 | Costin et al. |
| 8,099,224 B2 | 1/2012 | Tripathi et al. |
| 8,108,132 B2 | 1/2012 | Reinke |
| 8,131,445 B2 | 3/2012 | Tripathi et al. |
| 8,131,447 B2 | 3/2012 | Tripathi et al. |
| 8,135,410 B2 | 3/2012 | Forte |
| 8,145,410 B2 | 3/2012 | Berger et al. |
| 8,146,565 B2 | 4/2012 | Leone et al. |
| 8,272,367 B2 | 9/2012 | Shikama et al. |
| 8,347,856 B2 | 1/2013 | Leone et al. |
| 8,473,179 B2 | 6/2013 | Whitney et al. |
| 8,616,181 B2 | 12/2013 | Sahandiesfanjani et al. |
| 8,646,430 B2 | 2/2014 | Kinoshita |
| 8,646,435 B2 | 2/2014 | Dibble et al. |
| 8,701,628 B2 | 4/2014 | Tripathi et al. |
| 8,706,383 B2 | 4/2014 | Sauve et al. |
| 8,833,058 B2 | 9/2014 | Ervin et al. |
| 8,833,345 B2 | 9/2014 | Pochner et al. |
| 8,869,773 B2 | 10/2014 | Tripathi et al. |
| 8,979,708 B2 | 3/2015 | Burtch |
| 9,140,622 B2 | 9/2015 | Beikmann |
| 9,222,427 B2 | 12/2015 | Matthews et al. |
| 2001/0007964 A1 | 7/2001 | Poljansek et al. |
| 2002/0038654 A1 * | 4/2002 | Sasaki et al. ............ 123/568.11 |
| 2002/0039950 A1 | 4/2002 | Graf et al. |
| 2002/0156568 A1 | 10/2002 | Knott et al. |
| 2002/0162540 A1 | 11/2002 | Matthews et al. |
| 2002/0189574 A1 | 12/2002 | Kim |
| 2003/116130 A1 | 6/2003 | Kisaka et al. |
| 2003/0123467 A1 | 7/2003 | Du et al. |
| 2003/0131820 A1 | 7/2003 | Mckay et al. |
| 2003/0172900 A1 | 9/2003 | Boyer et al. |
| 2004/0007211 A1 | 1/2004 | Kobayashi |
| 2004/0034460 A1 | 2/2004 | Folkerts et al. |
| 2004/0069290 A1 | 4/2004 | Bucktron et al. |
| 2004/0122584 A1 | 6/2004 | Muto et al. |
| 2004/0129249 A1 | 7/2004 | Kondo |
| 2004/0206072 A1 | 10/2004 | Surnilla et al. |
| 2004/0258251 A1 | 12/2004 | Inoue et al. |
| 2005/0016492 A1 | 1/2005 | Matthews |
| 2005/0056250 A1 | 3/2005 | Stroh |
| 2005/0098156 A1 | 5/2005 | Ohtani |
| 2005/0131618 A1 | 6/2005 | Megli et al. |
| 2005/0197761 A1 | 9/2005 | Bidner et al. |
| 2005/0199220 A1 | 9/2005 | Ogiso |
| 2005/0204726 A1 | 9/2005 | Lewis |
| 2005/0204727 A1 | 9/2005 | Lewis et al. |
| 2005/0205028 A1 | 9/2005 | Lewis et al. |
| 2005/0205045 A1 | 9/2005 | Michelini et al. |

(56) References Cited

U.S. PATENT DOCUMENTS

| | | |
|---|---|---|
| 2005/0205060 A1 | 9/2005 | Michelini et al. |
| 2005/0205063 A1 | 9/2005 | Kolmanovsky et al. |
| 2005/0205069 A1 | 9/2005 | Lewis et al. |
| 2005/0205074 A1 | 9/2005 | Gibson et al. |
| 2005/0235743 A1 | 10/2005 | Stempnik et al. |
| 2006/0107919 A1 | 5/2006 | Nishi et al. |
| 2006/0112918 A1 | 6/2006 | Persson |
| 2006/0130814 A1 | 6/2006 | Bolander et al. |
| 2006/0178802 A1 | 8/2006 | Bolander et al. |
| 2007/0012040 A1 | 1/2007 | Nitzke et al. |
| 2007/0042861 A1 | 2/2007 | Takaoka et al. |
| 2007/0051351 A1 | 3/2007 | Pallett et al. |
| 2007/0100534 A1 | 5/2007 | Katsumata |
| 2007/0101969 A1 | 5/2007 | Lay et al. |
| 2007/0107692 A1 | 5/2007 | Kuo et al. |
| 2007/0131169 A1 | 6/2007 | Ahn |
| 2007/0131196 A1 | 6/2007 | Gibson et al. |
| 2007/0135988 A1 | 6/2007 | Kidston et al. |
| 2007/0235005 A1 | 10/2007 | Lewis |
| 2008/0000149 A1 | 1/2008 | Aradi |
| 2008/0041327 A1 | 2/2008 | Lewis et al. |
| 2008/0066699 A1 | 3/2008 | Michelini et al. |
| 2008/0098969 A1 | 5/2008 | Reed et al. |
| 2008/0109151 A1 | 5/2008 | Jaros et al. |
| 2008/0121211 A1 | 5/2008 | Livshiz et al. |
| 2008/0154468 A1 | 6/2008 | Berger et al. |
| 2008/0254926 A1 | 10/2008 | Schuseil et al. |
| 2008/0262698 A1 | 10/2008 | Lahti et al. |
| 2008/0288146 A1 | 11/2008 | Beechie et al. |
| 2009/0007877 A1 | 1/2009 | Raiford |
| 2009/0013667 A1 | 1/2009 | Winstead |
| 2009/0013668 A1 | 1/2009 | Winstead |
| 2009/0013669 A1 | 1/2009 | Winstead |
| 2009/0013969 A1 | 1/2009 | Winstead |
| 2009/0018746 A1 | 1/2009 | Miller et al. |
| 2009/0030594 A1 | 1/2009 | You et al. |
| 2009/0042458 A1 | 2/2009 | Kinoshita |
| 2009/0042463 A1 | 2/2009 | Kinoshita |
| 2009/0118914 A1 | 5/2009 | Schwenke et al. |
| 2009/0118968 A1 | 5/2009 | Livshiz et al. |
| 2009/0118975 A1 | 5/2009 | Murakami et al. |
| 2009/0118986 A1 | 5/2009 | Kita |
| 2009/0177371 A1 | 7/2009 | Reinke |
| 2009/0204312 A1 | 8/2009 | Moriya |
| 2009/0241872 A1 | 10/2009 | Wang et al. |
| 2009/0248277 A1 | 10/2009 | Shinagawa et al. |
| 2009/0248278 A1 | 10/2009 | Nakasaka |
| 2009/0292435 A1 | 11/2009 | Costin et al. |
| 2010/0006065 A1 | 1/2010 | Tripathi et al. |
| 2010/0010724 A1 | 1/2010 | Tripathi et al. |
| 2010/0012072 A1 | 1/2010 | Leone et al. |
| 2010/0030447 A1 | 2/2010 | Smyth et al. |
| 2010/0036571 A1 | 2/2010 | Han et al. |
| 2010/0042308 A1 | 2/2010 | Kobayashi et al. |
| 2010/0050993 A1 | 3/2010 | Zhao et al. |
| 2010/0059004 A1 | 3/2010 | Gill |
| 2010/0100299 A1 | 4/2010 | Tripathi et al. |
| 2010/0107630 A1 | 5/2010 | Hamama et al. |
| 2010/0211299 A1 | 8/2010 | Lewis et al. |
| 2010/0222989 A1 | 9/2010 | Nishimura |
| 2010/0282202 A1 | 11/2010 | Luken |
| 2010/0318275 A1 | 12/2010 | Borchsenius et al. |
| 2011/0005496 A1 | 1/2011 | Hiraya et al. |
| 2011/0030657 A1 | 2/2011 | Tripathi et al. |
| 2011/0048372 A1 | 3/2011 | Dibble et al. |
| 2011/0088661 A1 | 4/2011 | Sczomak et al. |
| 2011/0094475 A1 | 4/2011 | Riegel et al. |
| 2011/0107986 A1 | 5/2011 | Winstead |
| 2011/0118955 A1* | 5/2011 | Livshiz et al. ................ 701/103 |
| 2011/0144883 A1 | 6/2011 | Rollinger et al. |
| 2011/0178693 A1 | 7/2011 | Chang et al. |
| 2011/0208405 A1 | 8/2011 | Tripathi et al. |
| 2011/0213526 A1* | 9/2011 | Giles et al. ................ 701/35 |
| 2011/0213540 A1 | 9/2011 | Tripathi et al. |
| 2011/0213541 A1 | 9/2011 | Tripathi et al. |
| 2011/0251773 A1 | 10/2011 | Sahandiesfanjani et al. |
| 2011/0264342 A1 | 10/2011 | Baur et al. |
| 2011/0265454 A1 | 11/2011 | Smith et al. |
| 2011/0265771 A1 | 11/2011 | Banker et al. |
| 2011/0295483 A1 | 12/2011 | Ma et al. |
| 2011/0313643 A1 | 12/2011 | Lucatello et al. |
| 2012/0029787 A1 | 2/2012 | Whitney et al. |
| 2012/0055444 A1 | 3/2012 | Tobergte et al. |
| 2012/0103312 A1 | 5/2012 | Sasai et al. |
| 2012/0109495 A1 | 5/2012 | Tripathi et al. |
| 2012/0116647 A1 | 5/2012 | Pochner et al. |
| 2012/0143471 A1 | 6/2012 | Tripathi et al. |
| 2012/0180759 A1 | 7/2012 | Whitney et al. |
| 2012/0221217 A1 | 8/2012 | Sujan et al. |
| 2012/0285161 A1 | 11/2012 | Kerns et al. |
| 2013/0092127 A1 | 4/2013 | Pirjaberi et al. |
| 2013/0092128 A1 | 4/2013 | Pirjaberi et al. |
| 2013/0184949 A1 | 7/2013 | Saito et al. |
| 2013/0289853 A1 | 10/2013 | Serrano |
| 2014/0041625 A1 | 2/2014 | Pirjaberi et al. |
| 2014/0041641 A1 | 2/2014 | Carlson et al. |
| 2014/0053802 A1 | 2/2014 | Rayl |
| 2014/0053803 A1 | 2/2014 | Rayl |
| 2014/0053804 A1 | 2/2014 | Rayl et al. |
| 2014/0053805 A1 | 2/2014 | Brennan et al. |
| 2014/0069178 A1 | 3/2014 | Beikmann |
| 2014/0069374 A1 | 3/2014 | Matthews |
| 2014/0069375 A1 | 3/2014 | Matthews et al. |
| 2014/0069376 A1 | 3/2014 | Matthews et al. |
| 2014/0069377 A1 | 3/2014 | Brennan et al. |
| 2014/0069378 A1 | 3/2014 | Burleigh et al. |
| 2014/0069379 A1 | 3/2014 | Beikmann |
| 2014/0069381 A1 | 3/2014 | Beikmann |
| 2014/0090623 A1 | 4/2014 | Beikmann |
| 2014/0090624 A1 | 4/2014 | Verner |
| 2014/0102411 A1 | 4/2014 | Brennan |
| 2014/0190448 A1 | 7/2014 | Brennan et al. |
| 2014/0190449 A1 | 7/2014 | Phillips |
| 2014/0194247 A1 | 7/2014 | Burtch |
| 2014/0207359 A1 | 7/2014 | Phillips |
| 2015/0240671 A1 | 8/2015 | Nakamura |
| 2015/0260112 A1 | 9/2015 | Liu et al. |
| 2015/0260117 A1 | 9/2015 | Shost et al. |
| 2015/0361907 A1 | 12/2015 | Hayman et al. |

FOREIGN PATENT DOCUMENTS

| | | |
|---|---|---|
| CN | 101220780 A | 7/2008 |
| CN | 101353992 A | 1/2009 |
| CN | 101476507 A | 7/2009 |
| CN | 101586504 A | 11/2009 |
| CN | 102454493 A | 5/2012 |
| EP | 1489595 A2 | 12/2004 |
| JP | 2010223019 A | 10/2010 |
| JP | 2011149352 A | 8/2011 |

OTHER PUBLICATIONS

U.S. Appl. No. 13/798,384, Mar. 13, 2013, Burtch.
U.S. Appl. No. 13/798,400, Mar. 13, 2013, Phillips.
U.S. Appl. No. 13/798,435, Mar. 13, 2013, Matthews.
U.S. Appl. No. 13/798,451, Mar. 13, 2013, Rayl.
U.S. Appl. No. 13/798,471, Mar. 13, 2013, Matthews et al.
U.S. Appl. No. 13/798,518, Mar. 13, 2013, Beikmann.
U.S. Appl. No. 13/798,536, Mar. 13, 2013, Matthews et al.
U.S. Appl. No. 13/798,540, Mar. 13, 2013, Brennan et al.
U.S. Appl. No. 13/798,574, Mar. 13, 2013, Verner.
U.S. Appl. No. 13/798,586, Mar. 13, 2013, Rayl et al.
U.S. Appl. No. 13/798,590, Mar. 13, 2013, Brennan et al.
U.S. Appl. No. 13/798,624, Mar. 13, 2013, Brennan et al.
U.S. Appl. No. 13/798,701, Mar. 13, 2013, Burleigh et al.
U.S. Appl. No. 13/798,737, Mar. 13, 2013, Beikmann.
U.S. Appl. No. 13/798,775, Mar. 13, 2013, Phillips.
U.S. Appl. No. 13/799,116, Mar. 13, 2013, Brennan.
U.S. Appl. No. 13/799,129, Mar. 13, 2013, Beikmann.
U.S. Appl. No. 13/799,181, Mar. 13, 2013, Beikmann.
U.S. Appl. No. 14/143,267, Dec. 30, 2013, Gehringer et al.

(56) References Cited

OTHER PUBLICATIONS

U.S. Appl. No. 14/211,389, Mar. 14, 2014, Liu et al.
U.S. Appl. No. -14/310,063, Jun. 20, 2014, Wagh et al.
U.S. Appl. No. 14/449,726, Aug. 1, 2014, Hayman et al.
U.S. Appl. No. 14/548,501, Nov. 20, 2014, Beikmann et al.
U.S. Appl. No. 61/952737, Mar. 13, 2014, Shost et al.
U.S. Appl. No. 14/734,619, Jun. 9, 2015, Matthews.

International Search Report and Written Opinion dated Jun. 17, 2015 corresponding to International Application No. PCT/US2015/019496, 14 pages.
U.S. Appl. No. 14/231,807, Apr. 1, 2014, Lucido et al.
U.S. Appl. No. 14/242,001, Apr. 1, 2014, Shibata et al.
U.S. Appl. No. 14/242,058, Apr. 1, 2014, Shibata et al.
U.S. Appl. No. 14/242,247, Apr. 1, 2014, Shibata et al.

* cited by examiner

CYLINDER FIRING FRACTION DETERMINATION AND CONTROL SYSTEMS AND METHODS

FIELD

The present disclosure relates to internal combustion engines and more specifically to cylinder activation and deactivation control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. In some types of engines, air flow into the engine may be regulated via a throttle. The throttle may adjust throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

Under some circumstances, one or more cylinders of an engine may be deactivated. Deactivation of a cylinder may include deactivating opening and closing of intake valves of the cylinder and halting fueling of the cylinder. One or more cylinders may be deactivated, for example, to decrease fuel consumption when the engine can produce a requested amount of torque while the one or more cylinders are deactivated.

SUMMARY

In a feature, a cylinder firing fraction mapping system is disclosed. A selection module selects a gear ratio for a transmission, a turbine speed for a torque converter, and a torque request for an engine. A fueling determination module determines a first fueling rate based on a first cylinder firing fraction, the torque request, and an engine speed and determines a second fueling rate based on a second cylinder firing fraction, the torque request, and the engine speed. A mapping module selects one of the first and second cylinder firing fractions based on a comparison of the first and second fueling rates and stores the selected one of the first and second cylinder firing fractions in an entry of a mapping corresponding to the gear ratio, the turbine speed, and the torque request.

In further features, the mapping module selects the first cylinder firing fraction when the first fueling rate is less than the second fueling rate and selects the second cylinder firing fraction when the second fueling rate is less than the first fueling rate.

In still further features: the fueling determination module determines a third fueling rate based on a third cylinder firing fraction, the torque request, and the engine speed; and the mapping module selects one of the first, second, and third cylinder firing fractions based on a comparison of the first, second, and third fueling rates and stores the selected one of the first, second, and third cylinder firing fractions in the entry of the mapping corresponding to the gear ratio, the turbine speed, and the torque request.

In yet further features: the selection module further selects a second gear ratio for the transmission, a second turbine speed for the torque converter, and a second torque request for the engine; the fueling determination module determines a third fueling rate based on the first cylinder firing fraction, the second torque request, and a second engine speed and determines a fourth fueling rate based on the second cylinder firing fraction, the second torque request, and the second engine speed; and the mapping module selects one of the first and second cylinder firing fractions based on a comparison of the third and fourth fueling rates and stores the selected one of the first and second cylinder firing fractions in a second entry of the mapping corresponding to the second gear ratio, the second turbine speed, and the second torque request.

In still further features, an engine speed module determines the engine speed based on the turbine speed and a state of a torque converter clutch.

In yet further features, when the torque converter clutch is disengaged, the engine speed module determines the engine speed based on the torque request, a k-factor of the torque converter, and the turbine speed.

In further features, when the torque converter clutch is engaged, the engine speed module determines the engine speed based on the turbine speed and a torque converter clutch slip.

In still further features, a slip limit module determines a maximum torque converter clutch slip, and the mapping module prevents the selection of the first cylinder firing fraction when the torque converter clutch slip is greater than the maximum torque converter clutch slip.

In yet further features, a torque limit module determines a maximum torque output of the engine based on the first cylinder firing fraction, the gear ratio, and the engine speed, and the mapping module prevents the selection of the first cylinder firing fraction when the maximum torque output of the engine is less than the torque request.

In further features, an engine control system for a vehicle includes: the mapping; a torque request module that generates a torque request based on at least one driver input; and a cylinder control module that determines a target cylinder firing fraction based on the torque request and using the mapping and that controls activation and deactivation of cylinders of the engine based on the target firing fraction.

In a feature, a cylinder firing fraction mapping method is disclosed. The cylinder firing fraction mapping method includes: selecting a gear ratio for a transmission, a turbine speed for a torque converter, and a torque request for an engine; determining a first fueling rate based on a first cylinder firing fraction, the torque request, and an engine speed; determining a second fueling rate based on a second cylinder firing fraction, the torque request, and the engine speed; selecting one of the first and second cylinder firing fractions based on a comparison of the first and second fueling rates; and storing the selected one of the first and second cylinder firing fractions in an entry of a mapping corresponding to the gear ratio, the turbine speed, and the torque request.

In further features, the method further includes: selecting the first cylinder firing fraction when the first fueling rate is less than the second fueling rate; and selecting the second cylinder firing fraction when the second fueling rate is less than the first fueling rate.

In yet further features, the method further includes: determining a third fueling rate based on a third cylinder firing fraction, the torque request, and the engine speed; selecting one of the first, second, and third cylinder firing fractions based on a comparison of the first, second, and third fueling rates; and storing the selected one of the first, second, and third cylinder firing fractions in the entry of the mapping corresponding to the gear ratio, the turbine speed, and the torque request.

In still further features, the method further includes: selecting a second gear ratio for the transmission, a second turbine speed for the torque converter, and a second torque request for the engine; determining a third fueling rate based on the first cylinder firing fraction, the second torque request, and a second engine speed; determining a fourth fueling rate based on the second cylinder firing fraction, the second torque request, and the second engine speed; selecting one of the first and second cylinder firing fractions based on a comparison of the third and fourth fueling rates; and storing the selected one of the first and second cylinder firing fractions in a second entry of the mapping corresponding to the second gear ratio, the second turbine speed, and the second torque request.

In further features, the method further includes determining the engine speed based on the turbine speed and a state of a torque converter clutch.

In still further features, the method further includes, when the torque converter clutch is disengaged, determining the engine speed based on the torque request, a k-factor of the torque converter, and the turbine speed.

In yet further features, the method further includes, when the torque converter clutch is engaged, determining the engine speed based on the turbine speed and a torque converter clutch slip.

In further features, the method further includes: determining a maximum torque converter clutch slip; and preventing the selection of the first cylinder firing fraction when the torque converter clutch slip is greater than the maximum torque converter clutch slip.

In still further features, the method further includes: determining a maximum torque output of the engine based on the first cylinder firing fraction, the gear ratio, and the engine speed; and preventing the selection of the first cylinder firing fraction when the maximum torque output of the engine is less than the torque request.

In further features, an engine control method for a vehicle includes: the mapping; generating a torque request based on at least one driver input; determining a target cylinder firing fraction based on the torque request and using the mapping; and controlling activation and deactivation of cylinders of the engine based on the target firing fraction.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Internal combustion engines combust an air and fuel mixture within cylinders to generate torque. Under some circumstances, an engine control module (ECM) may deactivate one or more cylinders of the engine. The ECM may deactivate one or more cylinders, for example, to decrease fuel consumption.

The ECM determines a target firing fraction for the cylinders of the engine using a mapping of engine torque request, gear ratio, and engine speed to target firing fraction. A numerator of the target firing fraction may indicate how many cylinders to activate during the next X number of cylinders in a firing order of the cylinders, where X is the denominator of the target firing fraction. The ECM controls activation and deactivation of one or more cylinders of the engine based on the target firing fraction.

A mapping generation module generates the mapping of engine torque request, gear ratio, and turbine speed to target firing fraction. More specifically, for a given engine torque request, gear ratio, and engine speed, the mapping generation module determines fueling rates for a plurality of different possible firing fractions, respectively. The mapping generation module selects the possible firing fraction having the lowest fueling rate and indexes the selected possible firing fraction in the mapping in according to the given engine torque request, gear ratio, and turbine speed.

The mapping generation module identifies and stores the possible firing fraction having the lowest fueling rate for each possible combination of engine torque request, gear ratio, and turbine speed. The mapping generation module may also prevent the selection of possible firing fractions that would not achieve the engine torque request or that would produce torque converter clutch slip that is greater than a predetermined value. The mapping can be used by the ECM, as discussed above, to determine the target firing fraction and to control cylinder activation and deactivation.

Figure 1:
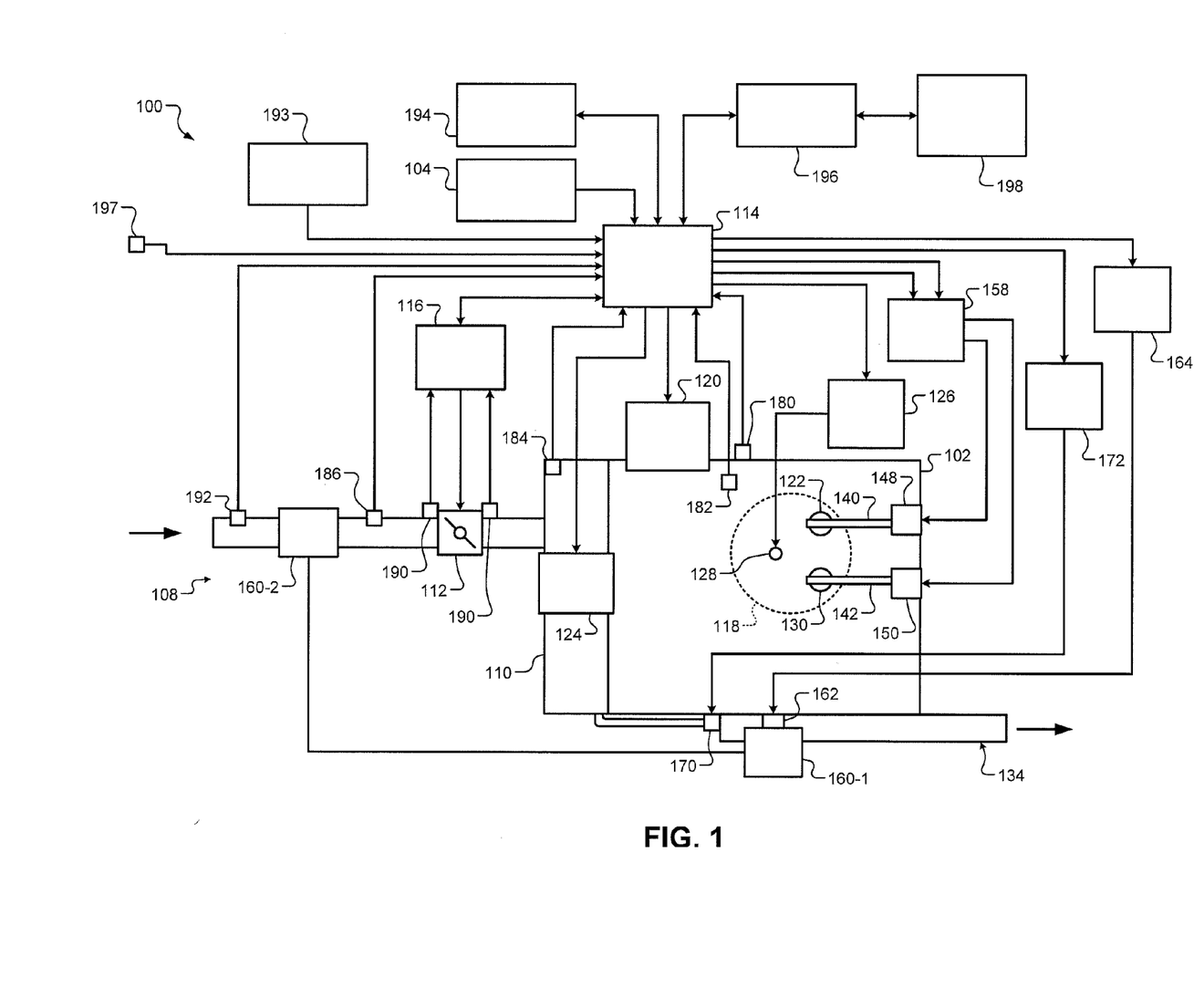
FIG. 1 is a functional block diagram of an example engine system.

Referring now to FIG. 1, a functional block diagram of an example engine system 100 is presented. The engine system 100 of a vehicle includes an engine 102 that combusts an air/fuel mixture to produce torque based on driver input from a driver input module 104. Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, as discussed further below, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may halt provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time at which the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft based valve actuation is shown and has been discussed, camless valve actuators may be implemented.

The cylinder actuator module 120 may deactivate the cylinder 118 by disabling opening of the intake valve 122 and/or the exhaust valve 130. The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine system 100 may include a boost device that provides pressurized air to the intake manifold 110. For example, FIG. 1 shows a turbocharger including a turbine 160-1 that is driven by exhaust gases flowing through the exhaust system 134. The turbocharger also includes a compressor 160-2 that is driven by the turbine 160-1 and that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. Although shown separated for purposes of illustration, the turbine 160-1 and the compressor 160-2 may be mechanically linked to each other, placing intake air in close proximity to hot exhaust. The compressed air charge may absorb heat from components of the exhaust system 134.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. The engine 102 outputs torque to a transmission via a torque converter. The torque converter includes an impeller, a turbine, and a torque converter clutch (TCC). The engine 102 drives the impeller. The turbine is coupled a transmission input shaft. Hydraulic fluid pumped to the turbine by the impeller drives the turbine. The TCC couples and decouples the turbine to and from the impeller. A turbine speed may be measured using a turbine speed sensor 197.

The engine system 100 may also include one or more other sensors 193. The ECM 114 may use signals from the sensors to make control decisions for the engine system 100.

The ECM 114 may communicate with a transmission control module 194 to coordinate shifting gears in the transmission. For example, the ECM 114 may reduce engine torque during a gear shift. Torque is transferred between the transmission input shaft and a transmission output shaft via the gears.

Torque is transferred between the transmission output shaft and wheels of the vehicle via one or more differentials, driveshafts, etc. The engine 102, the transmission, the differential(s), driveshafts, and other torque transferring or creating components make up a powertrain of the vehicle.

The ECM 114 may communicate with a hybrid control module 196 to coordinate operation of the engine 102 and an electric motor 198. The electric motor 198 may also function as a generator, and may be used to produce electrical energy for use by vehicle electrical systems and/or for storage in a battery. While only the electric motor 198 is shown and discussed, multiple electric motors may be implemented. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the boost actuator module 164, and the EGR actuator module 172. For these engine actuators, the actuator values may correspond to a cylinder activation/deactivation sequence, fueling rate, intake and exhaust cam phaser angles, boost pressure, and EGR valve opening area, respectively. The ECM 114 may control the actuator values in order to cause the engine 102 to generate a requested engine output torque.

Figure 2:
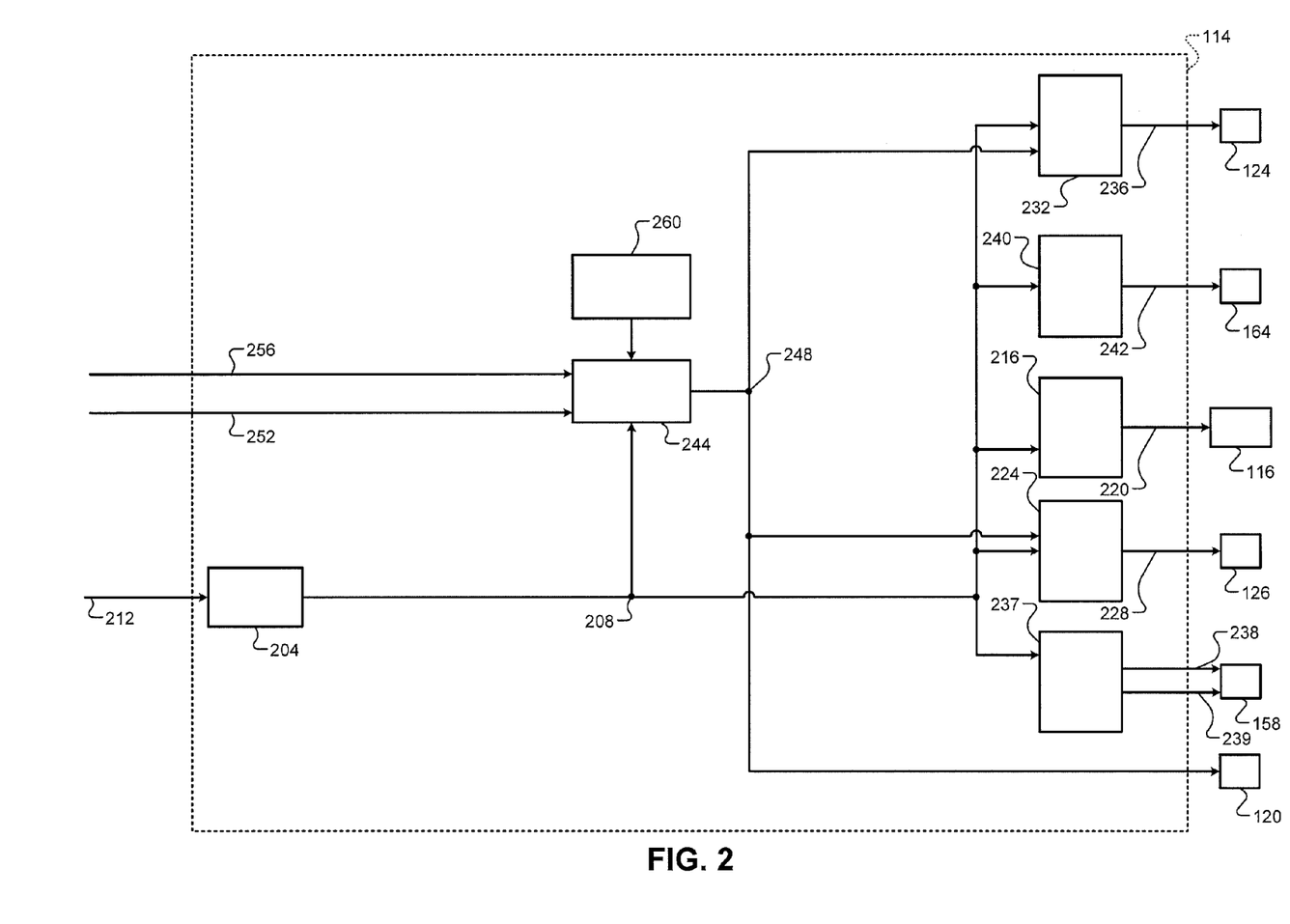
FIG. 2 is a functional block diagram of an example engine control system.

Referring now to FIG. 2, a functional block diagram of an example engine control system is presented. A torque request module 204 determines a torque request 208 for the engine 102 based on one or more driver inputs 212. The driver inputs 212 may include, for example, an accelerator pedal position, a brake pedal position, a cruise control input, and/or one or more other suitable driver inputs. The torque request module 204 may determine the torque request 208 additionally or alternatively based on one or more other torque requests, such as torque requests generated by the ECM 114 and/or torque requests received from other modules of the vehicle, such as the transmission control module 194, the hybrid control module 196, a chassis control module, etc.

One or more engine actuators are controlled based on the torque request 208 and/or one or more other parameters. For example, a throttle control module 216 may determine a target throttle opening 220 based on the torque request 208. The throttle actuator module 116 may adjust opening of the throttle valve 112 based on the target throttle opening 220.

A spark control module 224 determines a target spark timing 228 based on the torque request 208. The spark actuator module 126 generates spark based on the target spark timing 228. A fuel control module 232 determines one or more target fueling parameters 236 based on the torque request 208. For example, the target fueling parameters 236 may include fuel injection amount, number of fuel injections for injecting the amount, and timing for each of the injections. The fuel actuator module 124 injects fuel based on the target fueling parameters 236.

A phaser control module 237 determines target intake and exhaust cam phaser angles 238 and 239 based on the torque request 208. The phaser actuator module 158 may regulate the intake and exhaust cam phasers 148 and 150 based on the target intake and exhaust cam phaser angles 238 and 239, respectively. A boost control module 240 may determine a target boost 242 based on the torque request 208. The boost actuator module 164 may control boost output by the boost device(s) based on the target boost 242.

A cylinder control module 244 generates a firing command 248 for a next cylinder in a predetermined firing order of the cylinders ("the next cylinder"). The firing command 248 indicates whether the next cylinder should be activated or deactivated. For example only, the cylinder control module 244 may set the firing command 248 to a first state (e.g., 1) when the next cylinder should be activated and set the firing command 248 to a second state (e.g., 0) when the next cylinder should be deactivated. While the firing command 248 is and will be discussed with respect to the next cylinder in the predetermined firing order, the firing command 248 may be generated for a second cylinder immediately following the next cylinder in the predetermined firing order, a third cylinder immediately following the second cylinder in the predetermined firing order, or another cylinder following the next cylinder in the predetermined firing order.

The cylinder actuator module 120 deactivates the intake and exhaust valves of the next cylinder when the firing command 248 indicates that the next cylinder should be deactivated. The cylinder actuator module 120 allows opening and closing of the intake and exhaust valves of the next cylinder when the firing command 248 indicates that the next cylinder should be activated.

The fuel control module 232 halts fueling of the next cylinder when the firing command 248 indicates that the next cylinder should be deactivated. The fuel control module 232 sets the target fueling parameters 236 to provide fuel to the next cylinder when the firing command 248 indicates that the next cylinder should be activated. The spark control module 224 may provide spark to the next cylinder when the firing command 248 indicates that the next cylinder should be activated. The spark control module 224 may provide or halt spark to the next cylinder when the firing command 248 indicates that the next cylinder should be deactivated. Cylinder deactivation is different than fuel cutoff (e.g., deceleration fuel cutoff) in that the intake and exhaust valves of cylinders to which fueling is halted during fuel cutoff are still opened and closed during fuel cutoff whereas the intake and exhaust valves of cylinders are maintained closed when those cylinders are deactivated.

The cylinder control module 244 determines the firing command 248 based on a target firing fraction. The cylinder control module 244 may determine the firing command 248 further based on whether one or more cylinders before the next cylinder in the predetermined firing order were activated or deactivated.

The cylinder control module 244 determines the target firing fraction based on the torque request 208, a current gear ratio 252 of the transmission, and a turbine speed 256. The transmission control module 194 may communicate the current gear ratio 252 to the ECM 114, or the current gear ratio 252 may be determined based on one or more other parameters, such as a ratio of a transmission input shaft speed to a transmission output shaft speed. In various implementations, a current gear ratio of the powertrain of the vehicle may be used. The turbine speed 256 may be measured using the turbine speed sensor 197.

The cylinder control module 244 determines the target firing fraction using a firing fraction mapping 260. The firing fraction mapping 260 includes mapping (e.g., look up table) that relates the torque request 208, the current gear ratio 252, and the turbine speed 256 to the target firing fraction. As discussed further below, the values of the firing fraction mapping 260 are calibrated to minimize fueling.

The target firing fraction corresponds to a target number of cylinders to be activated out of the next N cylinders in the predetermined firing order of the cylinders. N is an integer that is greater than or equal to the target number of cylinders. For example, the target firing fraction may be a fraction between 0 and 1, inclusive. A target firing fraction of 0 corresponds to all of the cylinders of the engine 102 being deactivated (and 0 being activated), and a target firing fraction of 1 corresponds to all of the cylinders of the engine 102 being activated (and 0 being deactivated).

The cylinder control module 244 may generate the firing command 248 based on the target firing fraction, for example, using one or more functions and/or mappings that relate the target firing fraction to the firing command 248. Examples for setting the firing command 248 based on the target firing fraction can be found in U.S. patent application Ser. No. 13/798,400, filed on Mar. 13, 2013, which is incorporated herein in its entirety. As discussed above, cylinders are activated and deactivated based on the firing command 248.

Figure 3:
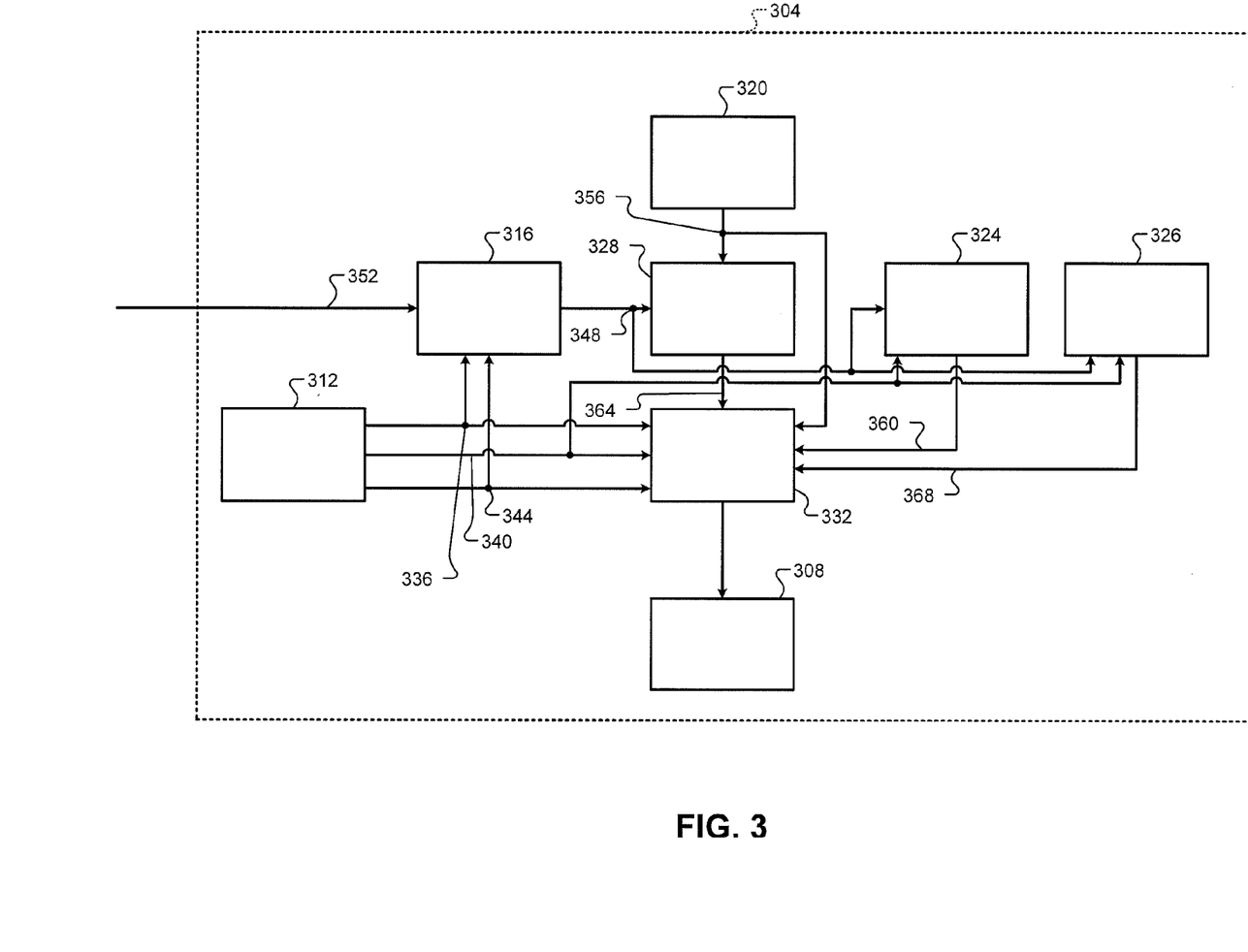
FIG. 3 is a functional block diagram of an example mapping generation module.

FIG. 3 is a functional block diagram of an example mapping generation module 304. For example, only, a dynamometer may include the mapping generation module 304. The mapping generation module 304 generates a firing fraction mapping 308 for the engine 102. The firing fraction mapping 308 can be stored in the ECM 114 of the engine 102 and in the ECMs of other engines that are the same as the engine 102. These firing fraction mappings can then be used to control cylinder activation and deactivation based on torque request, current gear ratio, and turbine speed.

The mapping generation module 304 a selection module 312, an engine speed module 316, a firing fraction selection module 320, a torque limit determination module 324, a slip limit determination module 326, a fueling determination module 328, and a mapping module 332. Operation of the mapping generation module 304 will be discussed in conjunction with FIGS. 4A and 4B, which include a flowchart depicting an example method of generating the firing fraction mapping 308.

Figure 4A:
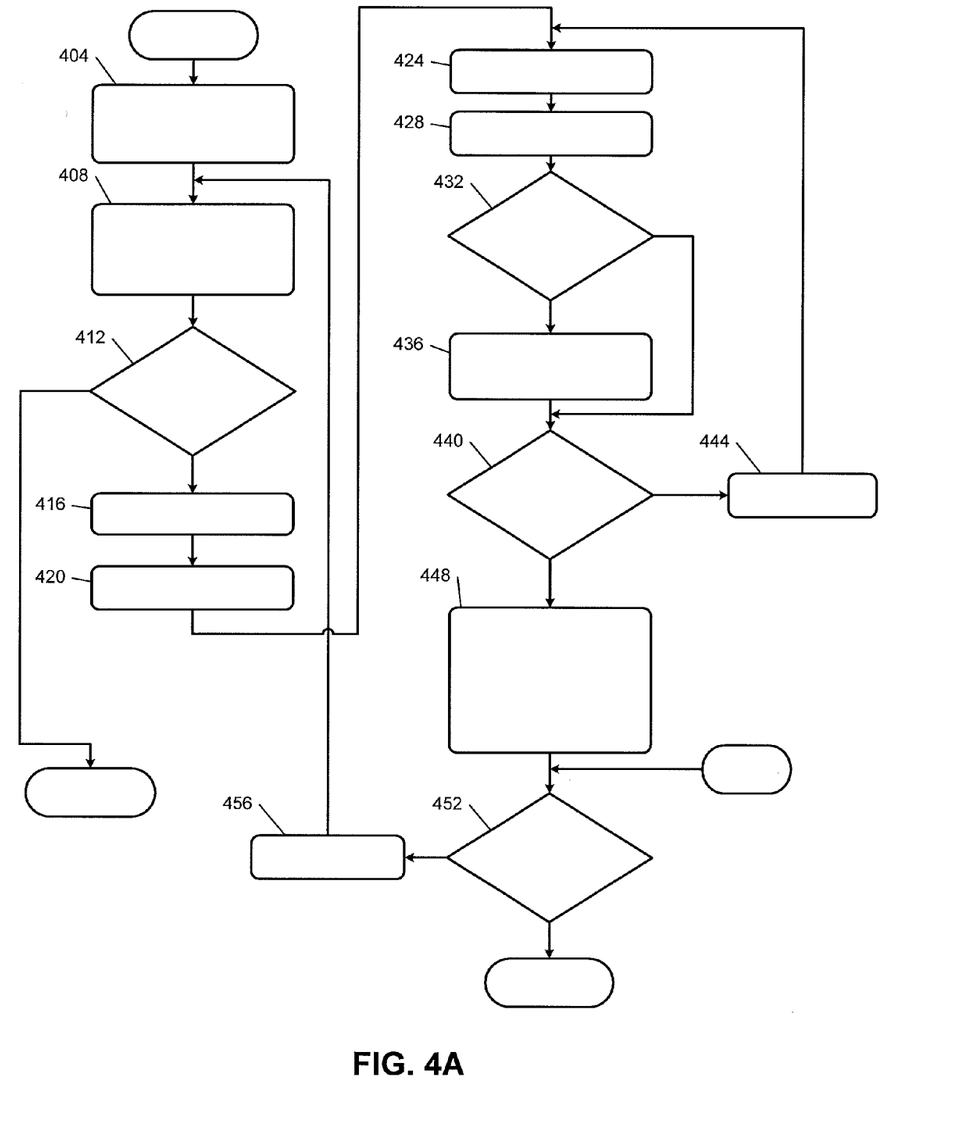
FIGS. 4A-4B include a flowchart depicting an example method of generating a mapping that can be used by an engine control system to determine a target firing fraction.

Referring now to FIGS. 3 and 4A, the selection module 312 sets a variable j equal to 1 at 404. At 408, the selection module 312 selects a j-th possible set of values for: the torque request 208, the current gear ratio 252, and the turbine speed 256. The selected torque request, gear ratio, and turbine speed are represented by 336, 340, and 344, respectively, in FIG. 3.

At 412, the mapping generation module 304 determines whether the TCC is disengaged for the selected torque request 336, the selected gear ratio 340, and the selected turbine speed 344. If 412 is false, control continues with FIG. 4B, which is discussed further below. If 412 is true, control continues with 416.

At 416, the engine speed module 316 determines an engine speed 348. The engine speed module 316 determines the engine speed 348 at 416 based on a turbine speed 352, the selected torque request 336, and a predetermined k-factor of the torque converter. For example only, the engine speed module 316 may determine the engine speed 348 using a function or a mapping that relates the turbine speed 352, the selected torque request 336, and the k-factor to the engine speed 348. The turbine speed 352 may be, for example, measured using a sensor or estimated based on one or more other parameters.

The firing fraction selection module 320 sets a variable i equal to 1 at 420. At 424, the firing fraction selection module 320 selects an i-th possible firing fraction for the cylinders. The possible firing fractions are predetermined and may include, for example, 0 (or %), 1/9, 1/8, 1/7, 1/6, 1/5, 2/9, 1/4, 2/7, 1/3, 3/8, 2/5, 3/7, 4/9, 1/2, 5/9, 4/7, 3/5, 5/8, 2/3, 5/7, 3/4, 7/9, 4/5, 5/6, 6/7, 7/8, 8/9, 1 (or 1/1), and/or one or more other suitable firing fractions. For example the possible firing fraction of 1/9 may correspond to 1 activated cylinder over the next 9 cylinders in the predetermined firing order. The numerator of a firing fraction corresponds to how many cylinders should be activated, and the denominator of a firing fraction corresponds to a total number of cylinders over which those cylinders should be activated. The selected one of the possible firing fractions is indicated by 356.

At 428, the torque limit determination module 324 determines a torque limit 360 based on the selected gear ratio 340, the engine speed 348, and the selected firing fraction 356. The torque limit 360 may correspond to a maximum torque that the engine 102 can produce using the selected firing fraction 356 at the selected gear ratio 340 and the engine speed 348. The torque limit determination module 324 may determine the torque limit 360 using a function or a mapping that relates the selected firing fraction 356, the selected gear ratio 340, and the engine speed 348 to the torque limit 360.

At 432, the mapping module 332 determines whether the torque limit 360 is less than the selected torque request 336. If 432 is true, the selected firing fraction 356 will be unable to achieve the selected torque request 336. Thus, the mapping module 332 does not consider the selected firing fraction 356, and control transfers to 440. If 432 is false, control continues with 436.

The fueling determination module 328 determines a fueling rate 364 at 436. The fueling determination module 328 determines the fueling rate 364 based on the selected firing fraction 356, the engine speed 348, the selected torque request 336, and the selected gear ratio 340. The fueling determination module 328 may determine the fueling rate 364 using a function or a mapping that relates the selected firing fraction 356, the selected gear ratio 340, the engine speed 348, and the selected torque request 336 to the fueling rate 364. Control continues with 440.

At 440, the mapping module 332 determines whether i is greater than N. N is a first predetermined value that is set to the total number of possible firing fractions. If 440 is true, control continues with 448. If 440 is false, the mapping module 332 increments i at 444, and control returns to 424 for selection of another one of the possible firing fractions.

At 448, once each of the possible firing fractions has been selected, the mapping module 332 selects the one of the possible firing fractions that produced the lowest value of the fueling rate 364. The mapping module 332 stores the one of the possible firing fractions that produced the lowest value of the fueling rate 364 in the firing fraction mapping 308 for the selected torque request 336, the selected gear ratio 340, and the selected turbine speed 344. In this manner, the one of the possible firing fractions that produced the lowest value of the fueling rate 364 will be selected and used to generate the firing command 248 when the torque request 208, the current gear ratio 252, and the turbine speed 256 are the same as the selected torque request 336, the selected gear ratio 340, and the selected turbine speed 344.

At 452, the selection module 312 determines whether j is greater than M. M is a second predetermined value that is set to the total number of possible sets of torque request, gear ratio, and turbine speed. In this manner, each of the possible fueling fractions is tested for each possible set of torque request, gear ratio, and turbine speed. The fueling fraction having the lowest fueling rate is stored in the firing fraction mapping 308 for each set of torque request, gear ratio, and turbine speed. If 452 is true, control may end. If 452 is false, the selection module 312 increments j at 456, and control returns to 408 for selection of another one of the possible sets of torque request, gear ratio, and turbine speed.

Figure 4B:
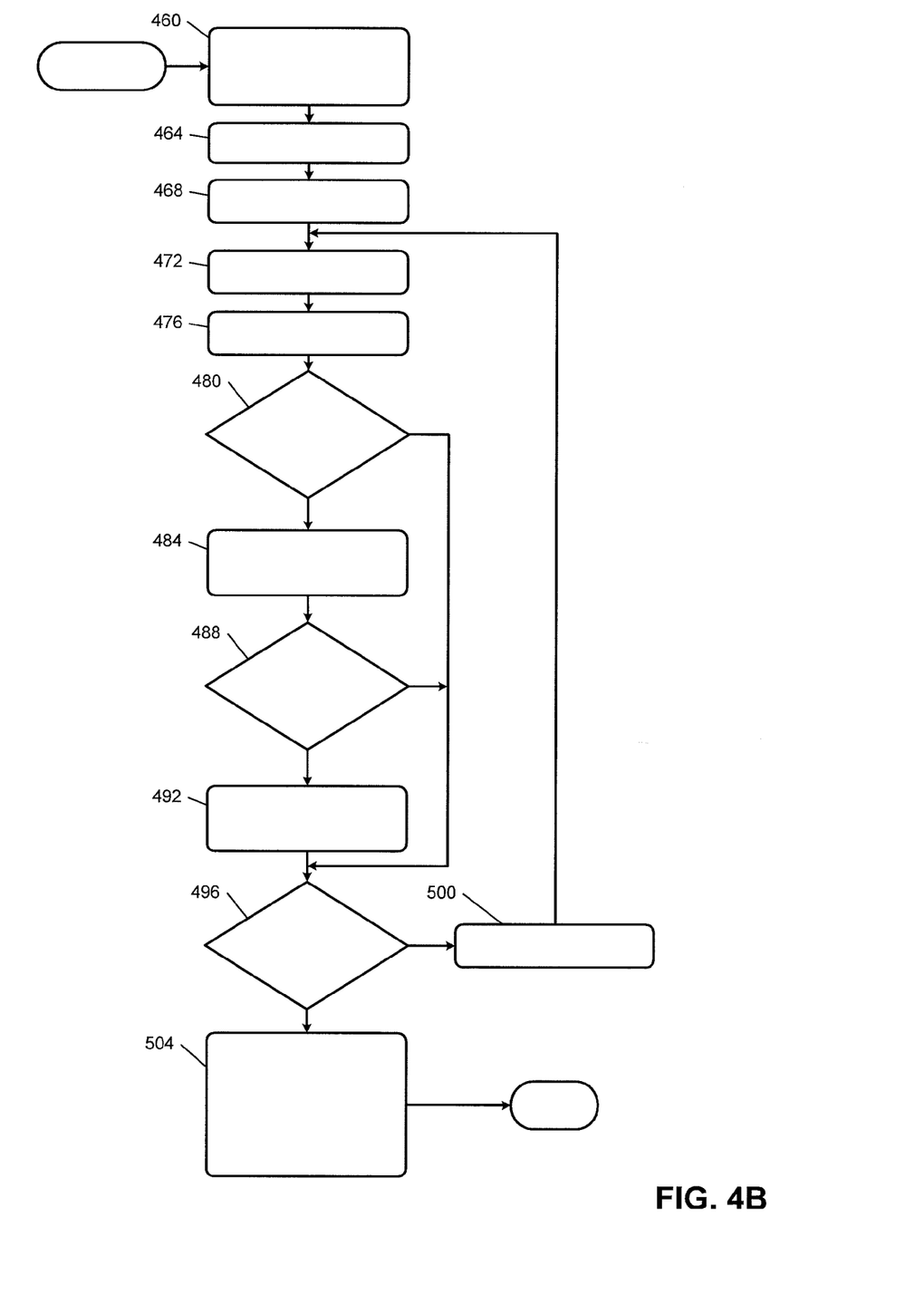

Referring now to FIGS. 4B and 3, (when TCC is not disengaged at 412), control continues with 460. At 460, the engine speed module 316 determines the engine speed 348. The engine speed module 316 determines the engine speed 348 at 464 based on the turbine speed 352 and a TCC slip. The engine speed module 316 may determine the engine speed 348 using a function or a mapping that relates the engine speed 348 and the TCC slip to the turbine speed 352. For example, the engine speed module 316 may set the engine speed 348 equal to the turbine speed 352 plus the TCC slip.

The engine speed module 316 determines the TCC slip based on the selected torque request 336, the selected gear ratio 340, and the selected turbine speed 344. For example, the engine speed module 316 may determine the TCC slip using a function or a mapping that relates the selected torque request 336, the selected gear ratio 340, and the selected turbine speed 344.

The firing fraction selection module 320 sets the variable i equal to 1 at 468. At 472, the firing fraction selection module 320 selects the i-th possible firing fraction for the cylinders. At 476, the torque limit determination module 324 determines the torque limit 360 based on the selected gear ratio 340, the engine speed 348, and the selected firing fraction 356, as described above.

At 480, the mapping module 332 determines whether the torque limit 360 is less than the selected torque request 336. If 480 is true, the selected firing fraction 356 will be unable to achieve the selected torque request 336. Thus, the mapping module 332 does not consider the selected firing fraction 356, and control transfers to 496. If 480 is false, control continue with 484.

The slip limit determination module 326 determines one or more TCC slip limits 368 at 484. For example, the slip limit determination module 326 may determine a first TCC slip limit for corresponding to a maximum allowable level of noise, vibration, and harshness (NVH) and/or a second TCC slip limit corresponding to maximizing durability of the TCC. The slip limit determination module 326 may determine the second TCC slip limit, for example, based on the engine speed 348, the selected torque request 336, and/or one or more other suitable parameters. The slip limit determination module 326 may determine the first TCC slip limit, for example, based on the selected firing fraction 356, the engine speed 348, the selected torque request 336, and/or one or more other suitable parameters. The slip limit determination module 326 may determine the first and second TCC slip limits using one or more functions and/or mappings. Control continues with 488.

At 488, the mapping module 332 determines whether the TCC slip is less than the first and second TCC slip limits. If 488 is true, control continues with 492. If 488 is false, the mapping module 332 does not consider the selected firing fraction 356, and control transfers to 496.

The fueling determination module 328 determines the fueling rate 364 at 492. The fueling determination module 328 determines the fueling rate 364 based on the selected firing fraction 356, the engine speed 348, the selected torque request 336, and the selected gear ratio 340. The fueling determination module 328 may determine the fueling rate 364 using a function or a mapping that relates the selected firing fraction 356, the selected gear ratio 340, the engine speed 348, and the selected torque request 336 to the fueling rate 364. Control continues with 496.

At 496, the mapping module 332 determines whether i is greater than N. As described above, N is set to the total number of possible firing fractions. If 496 is true, control continues with 504. If 496 is false, the mapping module 332 increments i at 500, and control returns to 472 for selection of another one of the possible firing fractions.

At 504, the mapping module 332 selects the one of the possible firing fractions that produced the lowest value of the fueling rate 364. The mapping module 332 stores the one of the possible firing fractions that produced the lowest value of the fueling rate 364 in the firing fraction mapping 308 for the selected torque request 336, the selected gear ratio 340, and the selected turbine speed 344. In this manner, the one of the possible firing fractions that produced the lowest value of the fueling rate 364 will be selected and used when the torque request 208, the current gear ratio 252, and the turbine speed 256 are the same as the selected torque request 336, the selected gear ratio 340, and the selected turbine speed 344. Control transfers to 452 of FIG. 4A after 504. The firing fraction entries of the firing fraction mapping 308 can also be filtered/smoothed to ensure that, for example, the selected firing fraction does not decrease as the selected torque request 336 increases while the selected gear ratio 340 and the selected turbine speed 344 are constant.

Once complete, the firing fraction mapping 308 can be stored (e.g., in memory) of the ECM 114 as the firing fraction mapping 260. The cylinder control module 244 determines the target firing fraction using the firing fraction mapping 260 and generates the firing command 248 based on the target firing fraction.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. An engine control system comprising:
a selection module that selects a gear ratio for a transmission, a turbine speed for a torque converter, and a first torque request for an engine;
a fueling determination module that determines a first fueling rate as a function of a first cylinder firing fraction, the first torque request, and an engine speed and that determines a second fueling rate as a function of a second cylinder firing fraction, the first torque request, and the engine speed;
a mapping module that selects one of the first and second cylinder firing fractions based on a comparison of the first and second fueling rates and that stores the selected one of the first and second cylinder firing fractions in an entry of a mapping corresponding to the gear ratio, the turbine speed, and the first torque request;
a torque request module that generates a second torque request based on at least one driver input; and
a cylinder control module that determines a target cylinder firing fraction based on the second torque request and using the mapping and that controls activation and deactivation of cylinders of the engine based on the target firing fraction.

2. The engine control system of claim 1 wherein the mapping module selects the first cylinder firing fraction when the first fueling rate is less than the second fueling rate and selects the second cylinder firing fraction when the second fueling rate is less than the first fueling rate.

3. The engine control system of claim 1 wherein:
the fueling determination module determines a third fueling rate as a function of a third cylinder firing fraction, the first torque request, and the engine speed; and
the mapping module selects one of the first, second, and third cylinder firing fractions based on a comparison of the first, second, and third fueling rates and stores the selected one of the first, second, and third cylinder firing fractions in the entry of the mapping corresponding to the gear ratio, the turbine speed, and the first torque request.

4. The engine control system of claim 1 wherein:
the selection module further selects a second gear ratio for the transmission, a second turbine speed for the torque converter, and a third torque request for the engine;
the fueling determination module determines a third fueling rate as a function of the first cylinder firing fraction, the third torque request, and a second engine speed and determines a fourth fueling rate as a function of the second cylinder firing fraction, the third torque request, and the second engine speed; and
the mapping module selects one of the first and second cylinder firing fractions based on a comparison of the third and fourth fueling rates and stores the selected one of the first and second cylinder firing fractions in a second entry of the mapping corresponding to the second gear ratio, the second turbine speed, and the third torque request.

5. The engine control system of claim 1 further comprising an engine speed module that determines the engine speed based on the turbine speed and a state of a torque converter clutch.

6. The engine control system of claim 5 wherein, when the torque converter clutch is disengaged, the engine speed module determines the engine speed based on the first torque request, a k-factor of the torque converter, and the turbine speed.

7. The engine control system of claim 5 wherein, when the torque converter clutch is engaged, the engine speed module determines the engine speed based on the turbine speed and a torque converter clutch slip.

8. The engine control system of claim 7 further comprising a slip limit module that determines a maximum torque converter clutch slip,
wherein the mapping module prevents the selection of the first cylinder firing fraction when the torque converter clutch slip is greater than the maximum torque converter clutch slip.

9. The engine control system of claim 1 further comprising a torque limit module that determines a maximum torque output of the engine based on the first cylinder firing fraction, the gear ratio, and the engine speed,
wherein the mapping module prevents the selection of the first cylinder firing fraction when the maximum torque output of the engine is less than the first torque request.

10. An engine control method for a vehicle comprising:
selecting a gear ratio for a transmission, a turbine speed for a torque converter, and a first torque request for an engine;
determining a first fueling rate as a function of a first cylinder firing fraction, the first torque request, and an engine speed;
determining a second fueling rate as a function of a second cylinder firing fraction, the first torque request, and the engine speed;
selecting one of the first and second cylinder firing fractions based on a comparison of the first and second fueling rates;
storing the selected one of the first and second cylinder firing fractions in an entry of a mapping corresponding to the gear ratio, the turbine speed, and the first torque request;
generating a second torque request based on at least one driver input;
determining a target cylinder firing fraction based on the second torque request and using the mapping; and
controlling activation and deactivation of cylinders of the engine based on the target firing fraction.

11. The engine control method of claim 10 further comprising:
selecting the first cylinder firing fraction when the first fueling rate is less than the second fueling rate; and
selecting the second cylinder firing fraction when the second fueling rate is less than the first fueling rate.

12. The engine control method of claim 10 further comprising:
determining a third fueling rate as a function of a third cylinder firing fraction, the first torque request, and the engine speed;
selecting one of the first, second, and third cylinder firing fractions based on a comparison of the first, second, and third fueling rates; and
storing the selected one of the first, second, and third cylinder firing fractions in the entry of the mapping corresponding to the gear ratio, the turbine speed, and the first torque request.

13. The engine control method of claim 10 further comprising:
selecting a second gear ratio for the transmission, a second turbine speed for the torque converter, and a third torque request for the engine;
determining a third fueling rate as a function of the first cylinder firing fraction, the third torque request, and a second engine speed;
determining a fourth fueling rate as a function of the second cylinder firing fraction, the third torque request, and the second engine speed;
selecting one of the first and second cylinder firing fractions based on a comparison of the third and fourth fueling rates; and
storing the selected one of the first and second cylinder firing fractions in a second entry of the mapping corresponding to the second gear ratio, the second turbine speed, and the third torque request.

14. The engine control method of claim 10 further comprising determining the engine speed based on the turbine speed and a state of a torque converter clutch.

15. The engine control method of claim 14 further comprising, when the torque converter clutch is disengaged, determining the engine speed based on the first torque request, a k-factor of the torque converter, and the turbine speed.

16. The engine control method of claim 14 further comprising, when the torque converter clutch is engaged, determining the engine speed based on the turbine speed and a torque converter clutch slip.

17. The engine control method of claim 16 further comprising:
determining a maximum torque converter clutch slip; and
preventing the selection of the first cylinder firing fraction when the torque converter clutch slip is greater than the maximum torque converter clutch slip.

18. The engine control method of claim 10 further comprising:
determining a maximum torque output of the engine based on the first cylinder firing fraction, the gear ratio, and the engine speed; and
preventing the selection of the first cylinder firing fraction when the maximum torque output of the engine is less than the first torque request.

19. An engine control system comprising:
a selection module that selects a gear ratio for a transmission, a turbine speed for a torque converter, and a first torque request for an engine;
a fueling determination module that determines a first fueling rate based on a first cylinder firing fraction, the first torque request, and an engine speed and that determines a second fueling rate based on a second cylinder firing fraction, the first torque request, and the engine speed;
a mapping module that selects one of the first and second cylinder firing fractions based on a comparison of the first and second fueling rates and that stores the selected one of the first and second cylinder firing fractions in an entry of a mapping corresponding to the gear ratio, the turbine speed, and the first torque request;
a torque request module that generates a second torque request based on at least one driver input; and
a cylinder control module that determines a target cylinder firing fraction based on the second torque request and using the mapping and that controls activation and deactivation of cylinders of the engine based on the target firing fraction,
a slip limit module that determines a maximum torque converter clutch slip,
wherein the mapping module prevents the selection of the first cylinder firing fraction when a torque converter clutch slip is greater than the maximum torque converter clutch slip.

* * * * *

UNITED STATES PATENT AND TRADEMARK OFFICE
CERTIFICATE OF CORRECTION

PATENT NO. : 9,441,550 B2  
APPLICATION NO. : 14/300469  
DATED : September 13, 2016  
INVENTOR(S) : Jinbiao Li and Haifeng Liu Page 1 of 1

It is certified that error appears in the above-identified patent and that said Letters Patent is hereby corrected as shown below:

On the Title Page

Item (72) Inventors:  
Add --Li-Chun Chien, Milpitas, CA (US)--  
Add --Steven E. Carlson, Oakland, CA (US)--  
Add --Louis J. Serrano, Los Gatos, CA (US)--

Signed and Sealed this  
Ninth Day of July, 2019

Andrei Iancu  
*Director of the United States Patent and Trademark Office*